United States Patent
Castillo et al.

(10) Patent No.: US 7,969,150 B2
(45) Date of Patent: Jun. 28, 2011

(54) DEMAGNETIZER TO ELIMINATE RESIDUAL MAGNETIZATION OF WELLBORE WALL PRODUCED BY NUCLEAR MAGNETIC RESONANCE LOGS

(75) Inventors: Homero C. Castillo, Kingwood, TX (US); Thomas Kruspe, Wietzendorf (DE)

(73) Assignee: Baker Hughes Incorporated, Houston, TX (US)

( * ) Notice: Subject to any disclaimer, the term of this patent is extended or adjusted under 35 U.S.C. 154(b) by 311 days.

(21) Appl. No.: 12/197,793

(22) Filed: Aug. 25, 2008

(65) Prior Publication Data

US 2009/0015254 A1 Jan. 15, 2009

Related U.S. Application Data

(63) Continuation-in-part of application No. 11/298,034, filed on Dec. 9, 2005, now Pat. No. 7,913,756.

(51) Int. Cl.
*G01V 3/00* (2006.01)
*G01V 3/18* (2006.01)

(52) U.S. Cl. .................... 324/303; 324/346
(58) Field of Classification Search .......... 324/303, 324/306, 314, 318–322, 368, 346; 370/338
See application file for complete search history.

(56) References Cited

U.S. PATENT DOCUMENTS

| | | | |
|---|---|---|---|
| 2,246,542 A | 6/1941 | Smith | |
| 4,384,313 A | 5/1983 | Steingroever et al. | |
| 4,700,142 A | 10/1987 | Kuckes | |
| 5,220,963 A | 6/1993 | Patton | |
| 5,351,755 A | 10/1994 | Howlett | |
| 5,481,808 A | 1/1996 | Kools et al. | |
| 6,580,273 B2 | 6/2003 | Reiderman et al. | |
| 7,082,994 B2 | 8/2006 | Frost, Jr. et al. | |
| 7,180,287 B2 * | 2/2007 | Rottengatter et al. | 324/303 |
| 7,405,563 B2 * | 7/2008 | Kruspe et al. | 324/303 |
| 2002/0112856 A1 | 8/2002 | Van Steenwyk et al. | |
| 2005/0248342 A1 * | 11/2005 | Rottengatter et al. | 324/303 |
| 2006/0170425 A1 * | 8/2006 | Kruspe | 324/368 |

(Continued)

FOREIGN PATENT DOCUMENTS

DE 2850562 A1 6/1980

(Continued)

OTHER PUBLICATIONS

Wilson et al.; "Wellbore Position Errors Caused by Drilling-Fluid Contamination," SPE 75329, SPE Drilling & Completion, Dec. 2001, pp. 208-213.
Wilson et al.; "Wellbore Position Errors Caused by Drilling-Fluid Contamination," SPE 71400, 2001 SPE Annual Technical Conference and Exhibition, New Orleans, LA, Sep. 30-Oct. 3, 2001, pp. 1-8.

(Continued)

*Primary Examiner* — Melissa J Koval
*Assistant Examiner* — Tiffany A Fetzner
(74) *Attorney, Agent, or Firm* — Mossman Kumar & Tyler PC

(57) ABSTRACT

An apparatus and method is disclosed for measuring a parameter of an earth formation surrounding a wellbore. A Nuclear Magnetic Resonance (NMR) tool and at least one second tool are conveyed in the wellbore on a wireline, the NMR tool having a magnetic influence on a region of the wellbore. The magnetic influence of the NMR tool is removed from the region of the wellbore using a demagnetizing device. The parameter of the earth formation is measured using the at least one second tool. A second demagnetizing device may be used to remove the magnetic influence of the at least one second tool from the region of the wellbore.

22 Claims, 20 Drawing Sheets

U.S. PATENT DOCUMENTS

2007/0206555 A1* 9/2007 Kruspe et al. .......... 370/338
2009/0015254 A1* 1/2009 Castillo et al. .......... 324/303

FOREIGN PATENT DOCUMENTS

EP 0021274 A1 1/1981
EP 0301671 A2 2/1989

OTHER PUBLICATIONS

Torkildsen et al.; "Drilling Fluid affects MWD Magnetic Azimuth and Wellbore Position," IADC/SPE 87169. IADS/SPE Drilling Conference, Dallas, Texas, Mar. 2-4, 2004, pp. 1-8.

* cited by examiner

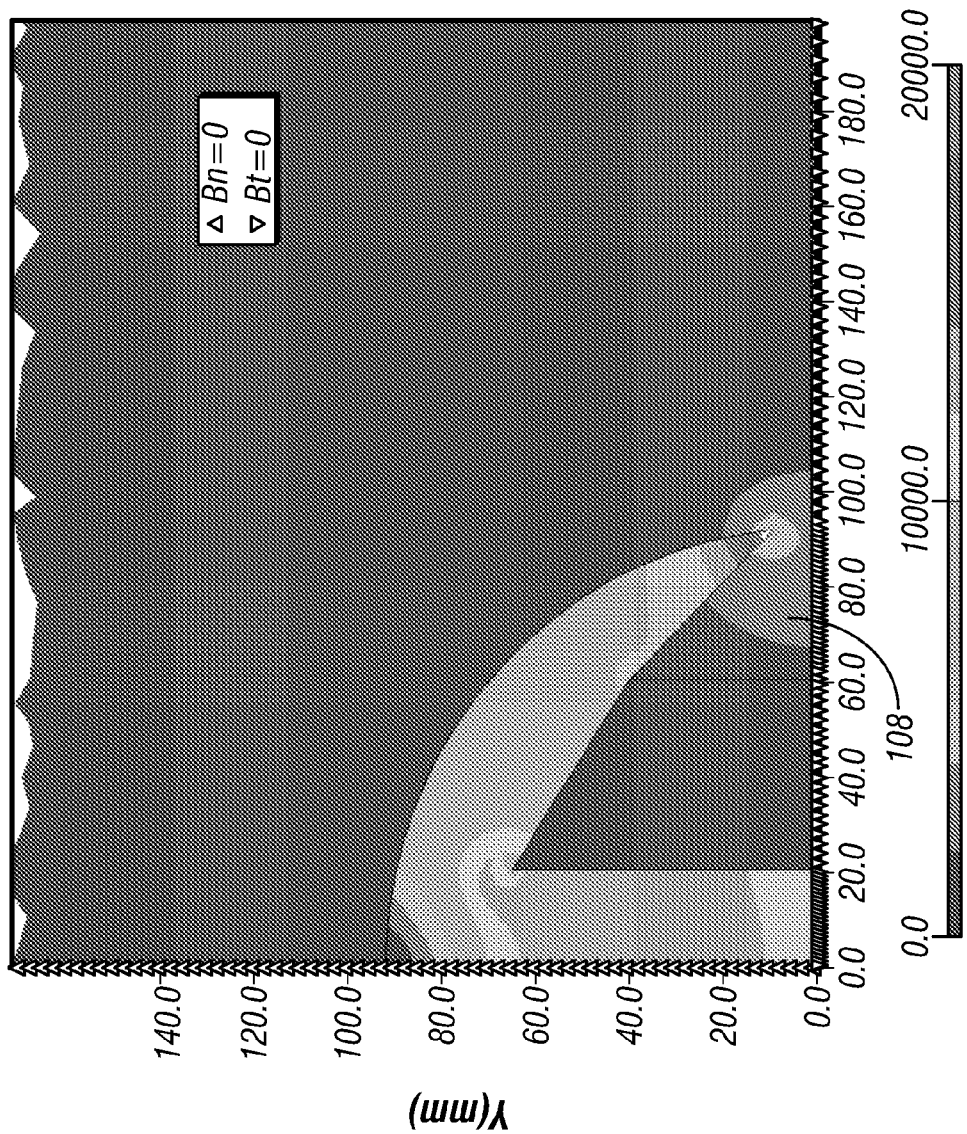

DEMAGNETIZER TO ELIMINATE RESIDUAL MAGNETIZATION OF WELLBORE WALL PRODUCED BY NUCLEAR MAGNETIC RESONANCE LOGS

CROSS-REFERENCES TO RELATED APPLICATIONS

This application is a continuation-in-part of U.S. patent application Ser. No. 11/298,034 of Kruspe et al., which claims priority from U.S. Provisional Patent Application Ser. No. 60/635,844 filed on 13Dec. 2004.

BACKGROUND OF THE DISCLOSURE

1. Field of the Disclosure

The disclosure relates generally to downhole formation analysis and provides an apparatus and methods for demagnetizing a wellbore.

2. Summary of the Related Art

It is well known that drilling mud may contain magnetic particles which may influence formation surveys taken by monitoring while drilling (MWD) directional sensors. This effect is described in IADC/SPE 87169 and SPE 71400. The magnetic particles are mainly due to wear on the casing and on the drill-string. The particles are known to collect especially in synthetic oil-based mud that is recycled and used for a long period of time and even at different locations. Magnetic filters (i.e., ditch magnets) have been used to filter magnetic particles but generally can not filter magnetic particles out of the mud that are too small to be attracted to the magnetic filter. Mud contaminated with magnetic steel particles can invade the formation and can also collect in a filter cake. This collection of magnetic particles typically creates a zone close to the wellbore wall containing magnetic material which can not circulate with the rest of the drilling mud. When permanent magnets from nuclear magnetic resonance (NMR) tools, magnetic fishing tools or casing collar locaters are moved through the wellbore, these collected particles can become magnetized. Because of magnetic remanance, the particles maintain their magnetization and provide a magnetic field for a long time. The magnetic field created by these magnetically aligned particles can influence the measurements obtained using magnetic tools deployed from a wireline or drill string, such as magnetic azimuth measurements or other magnetic measurements of the earth formation. A similar problem may occur in a cased wellbore in which the casing is made of a magnetic material such as steel. The residual magnetization of the casing may affect the performance of sensors such as magnetometers that are conveyed through the casing at a later time. Thus, there is a need to remove or reduce the effects on magnetic measurements of magnetic field remanance due to surrounding materials in a wellbore.

SUMMARY OF THE DISCLOSURE

In one embodiment, the present disclosure provides an apparatus conveyed on a wireline for measuring a parameter of an earth formation. The apparatus includes a Nuclear Magnetic Resonance (NMR) tool that magnetically influences a region of the wellbore; a demagnetizing device configured to remove the magnetic influence of the NMR tool from the region of the wellbore; and at least one second tool spaced apart from the NMR tool and configured to measure the parameter of the earth formation. The at least one second tool may include a plurality of tools. The apparatus may include a second demagnetizing device configured to remove a magnetic influence of the at least one second tool in the region of the wellbore. The parameter may include one of: (i) a formation resistivity, (ii) a dielectric constant of the formation, (iii) a presence of hydrocarbons in the formation, (iv) a porosity of the formation, (v) a density of the formation, and (vi) an earth's magnetic. The demagnetizing device is configured to produce a time-varying magnetic field. In one aspect, the amplitude of the time-varying magnetic field of the demagnetizing device in the region of the wellbore is affected by motion of the demagnetizing device through the wellbore. The demagnetizing device may include a spinning magnet that is one of: (i) a permanent magnet, and (ii) a DC-powered electromagnet. In another aspect, the demagnetizing device includes an AC-powered electromagnet configured to provide the time-varying magnetic field having a decaying amplitude. The demagnetizing device may include a processor configured to select an initial alternating current of the AC-powered electromagnet based on at least one of: (i) a saturation field of magnetized material in the region of the wellbore, and (ii) a magnetic field intensity which magnetized the material. The AC-powered electromagnet may be one of a two-pole structure and a four-pole structure. The axis of the time-varying magnetic field may be at least one of: (i) substantially parallel to a longitudinal axis of a downhole assembly, and (ii) substantially orthogonal to the longitudinal axis of the downhole assembly.

In another embodiment, the present disclosure provides a method of measuring a parameter of an earth formation surrounding a wellbore. The method includes conveying a Nuclear Magnetic Resonance (NMR) tool and at least one second tool in the wellbore on a wireline, the NMR tool having a magnetic influence on a region of the wellbore; removing the magnetic influence of the NMR tool from the region of the wellbore using a demagnetizing device; and measuring the parameter of the earth formation using the at least one second tool. The at least one second tool may include a plurality of tools. The magnetic influence of the at least one second tool may be removed from the region of the wellbore using a second demagnetizing device. The parameter may include one of: (i) a formation resistivity, (ii) a dielectric constant of the formation, (iii) a presence of hydrocarbons in the formation, (iv) a porosity of the formation, (v) a density of the formation, and (vi) an earth's magnetic field. The demagnetizing device produces a time-varying magnetic field. In one aspect, the amplitude of the time-varying magnetic field in the region of the wellbore is affected by moving the demagnetizing device through the wellbore. The demagnetizing device may include a spinning magnet that is one of: (i) a permanent magnet, and (ii) a DC-powered electromagnet. In another aspect, the demagnetizing device includes an AC-powered electromagnet providing the time-varying magnetic field having a decaying amplitude. The demagnetizing device may include a processor for selecting an initial alternating current of the AC-powered electromagnet based on at least one of: (i) a saturation field of magnetized material in the region of the wellbore, and (ii) a magnetic field intensity which magnetized the material. The AC-powered electromagnet may be one of a two-pole structure and a four-pole structure. The axis of the time-varying magnetic field may be at least one of: (i) substantially parallel to a longitudinal axis of a downhole assembly, and (ii) substantially orthogonal to the longitudinal axis of the downhole assembly.

Examples of certain features of the present disclosure are summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE FIGURES

For detailed understanding of the present disclosure, reference is made to the following detailed description of an exemplary embodiment, taken in conjunction with the accompanying drawings, in which like elements have been given like numerals.

FIGS. 11-12 show contour plots of the magnetic flux density for the two-pole demagnetizer of FIG. 10;

DETAILED DESCRIPTION OF THE DISCLOSURE

Figure 1:
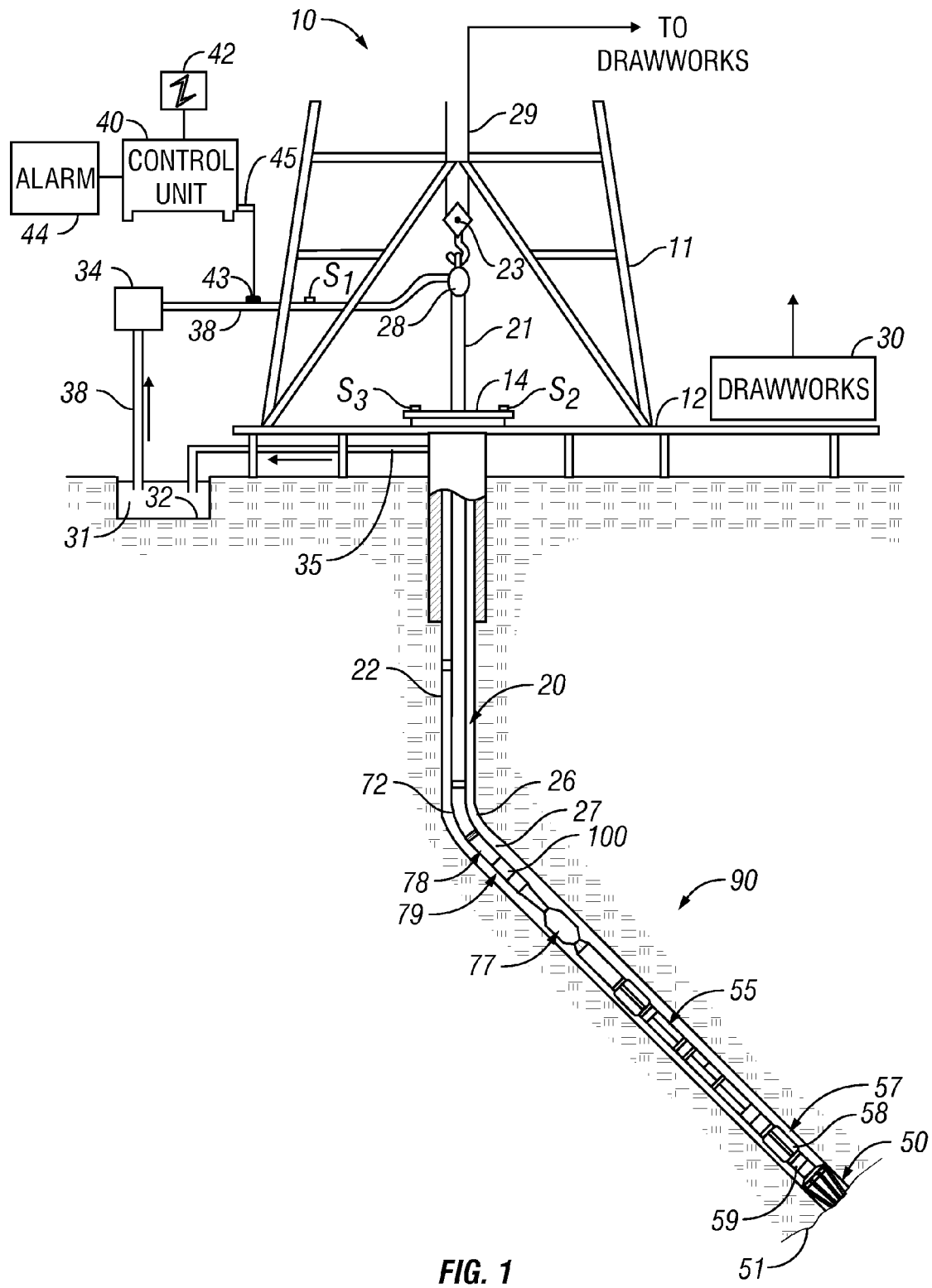
FIG. 1 shows an exemplary drilling system suitable for use with the methods of the present disclosure and having a drill string conveying a bottomhole assembly in a wellbore.

FIG. 1 illustrates a schematic diagram of a measurement-while-drilling (MWD) system 10 with a drill string 20 carrying a drilling assembly 90 (also referred to as the bottom hole assembly, or "BHA") conveyed in a "wellbore" or "borehole" 26 for drilling the wellbore. A demagnetizing sub 100 is positioned on the drill string 20 below NMR tool 79. The drilling system 10 includes a conventional derrick 11 erected on a floor 12 which supports a rotary table 14 that is rotated by a prime mover such as an electric motor (not shown) at a desired rotational speed. The drill string 20 includes tubing such as a drill pipe 22 or a coiled-tubing extending downward from the surface into the wellbore 26. The drill string 20 is pushed into the wellbore 26 when a drill pipe 22 is used as the tubing. For coiled-tubing applications, a tubing injector (not shown), however, is used to move the tubing from a source thereof, such as a reel (not shown), to the wellbore 26. The drill bit 50 attached to the end of the drill string breaks up the geological formations when it is rotated to drill the wellbore 26. If a drill pipe 22 is used, the drill string 20 is coupled to a drawworks 30 via a Kelly joint 21, swivel 28 and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drill string 20 by a mud pump 34. The drilling fluid passes from the mud pump 34 into the drill string 20 via a desurger 36, fluid line 38 and Kelly joint 21. The drilling fluid 31 is discharged at the wellbore bottom 51 through an opening in the drill bit 50. The drilling fluid 31 circulates uphole through the annular space 27 between the drill string 20 and the wellbore 26 and returns to the mud pit 32 via a return line 35. The drilling fluid acts to lubricate the drill bit 50 and to carry borehole cutting or chips away from the drill bit 50. A sensor $S_1$ preferably placed in the line 38 provides information about the fluid flow rate. A surface torque sensor $S_2$ and a sensor $S_3$ associated with the drill string 20 respectively provide information about the torque and rotational speed of the drill string. Additionally, a sensor (not shown) associated with line 29 is used to provide the hook load of the drill string 20.

In one embodiment, the drill bit 50 is rotated by only rotating the drill pipe 22. In another embodiment of the disclosure, a downhole motor 55 (mud motor) is disposed in the drilling assembly 90 to rotate the drill bit 50, and the drill pipe 22 is rotated usually to supplement the rotational power, if required, and to effect changes in the drilling direction.

In the embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

A drilling sensor module 59 is placed near the drill bit 50. The drilling sensor module contains sensors, circuitry and processing software relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the communication sub 72.

The communication sub 72, a power unit 78 and an Nuclear Magnetic Resonance (NMR) tool 79 are all connected in tandem with the drill string 20. Flex subs, for example, are used in connecting the MWD tool 79 in the drilling assembly 90. Such subs and tools form the bottom hole drilling assembly 90 between the drill string 20 and the drill bit 50. The drilling assembly 90 makes various measurements including the pulsed NMR measurements while the wellbore 26 is being drilled. The communication sub 72 obtains the signals and measurements and transfers the signals, using two-way telemetry, for example, to be processed at a surface processor. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 preferably includes a computer or a microprocessor-based processing system, memory for storing programs or models and data, a recorder for recording data, and other peripherals. The control unit 40 is preferably adapted to activate alarms 44 when certain unsafe or undesirable operating conditions occur.

Figure 2:
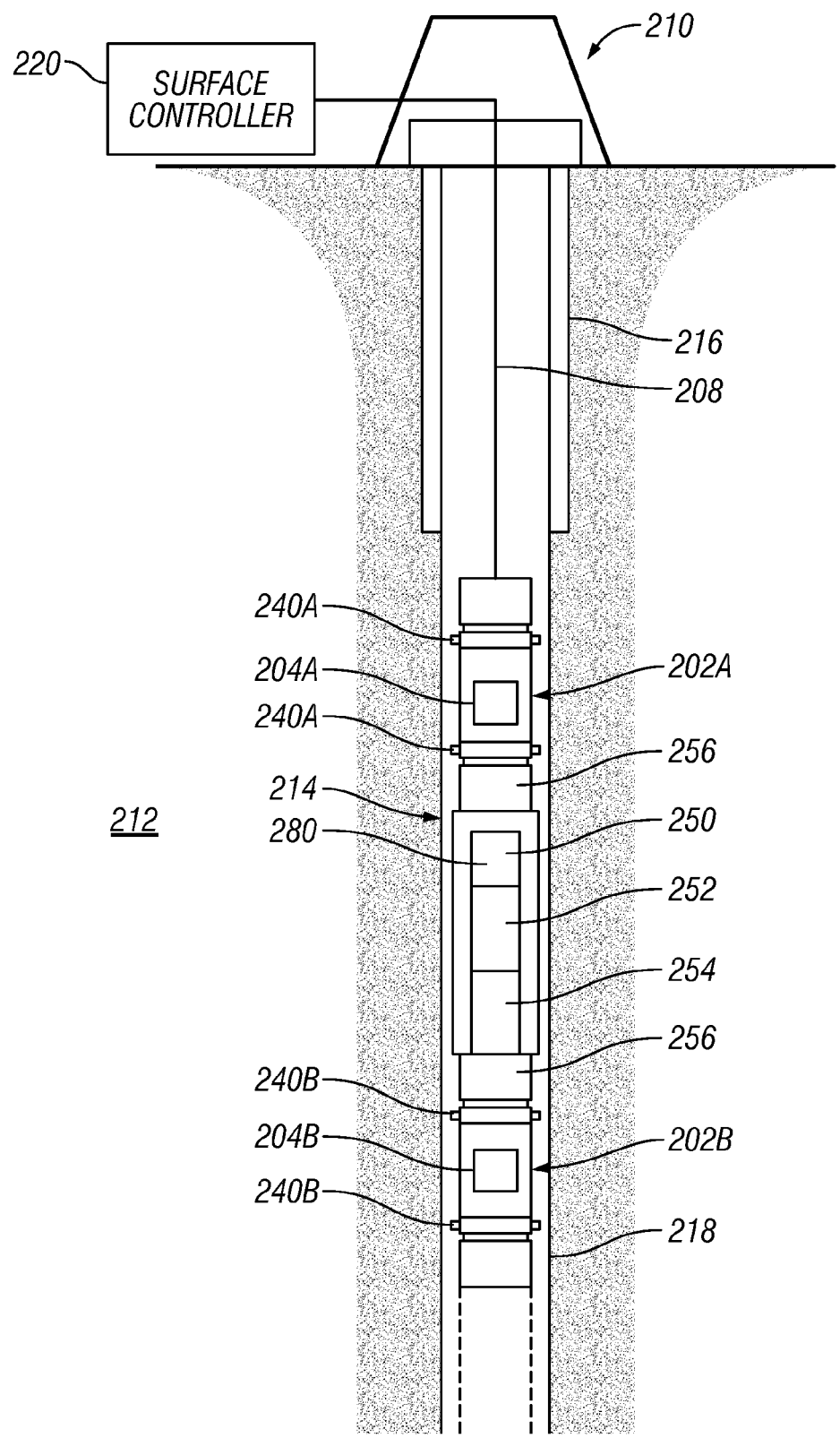
FIG. 2 is a schematic illustration of an exemplary embodiment of the present disclosure implemented on a wireline-conveyed string of logging instruments.

FIG. 2 shows an embodiment of the disclosure implemented on a string of logging instruments conveyed on a wireline. Items specific to the wireline implementation are discussed below after the discussion of various devices that may be used in conjunction with an MWD implementation or with a wireline implementation.

Figure 3:
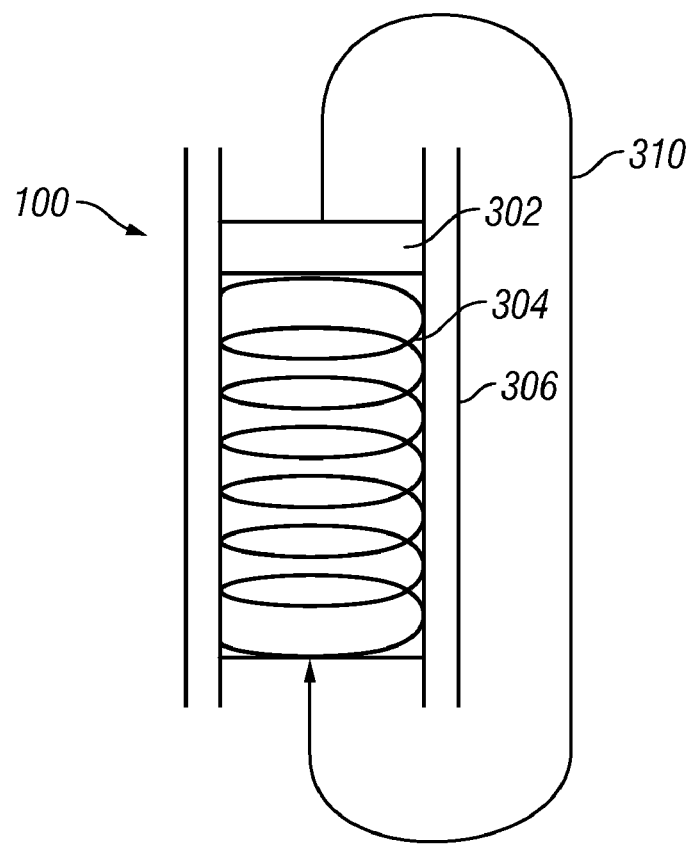
FIG. 3 shows a demagnetizing sub having an electromagnetic erasure field parallel to the wellbore.

Turning now to FIG. 3, a schematic of an exemplary demagnetizing sub 100 of the present disclosure is illustrated showing demagnetizing sub 100 with a magnetic flux, B field 310 parallel to the axis of the wellbore 306. As shown in FIG. 3, in this geometry the axis of the coil 304 of the electromagnet is parallel with the cylinder axis of the demagnetizing sub 100. The sub may be part of a bottomhole assembly (BHA) conveyed on a drilling tubular or may be part of a string of wireline conveyed subs. For the purposes of the present disclosure, the term "bottomhole assembly" is used to designate a BHA or a string of wireline tools. Smart alternating current supply 302 includes a processor for providing a controlled alternating current to the electromagnet coil 304. A vertical coil with an iron core produces a magnetic field similar to that produced by an NMR tool, but the magnetic field is weaker unless an electric input of many kW is provided. To produce a strong magnetic field with low power, a yoke is typically used to concentrate the field outside the wellbore in a ring around the tool.

Figure 4:
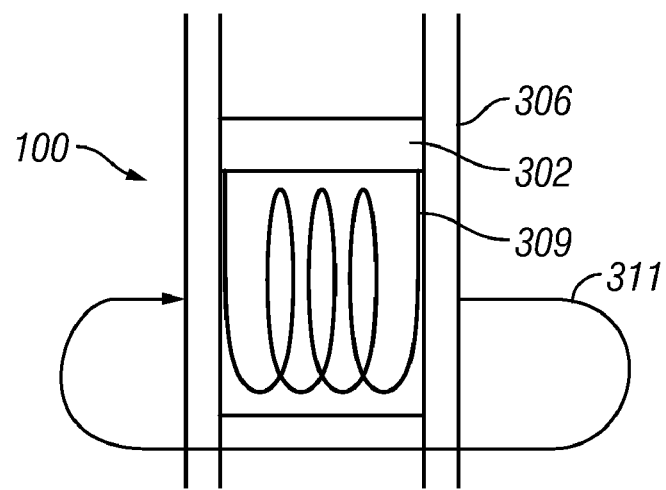
FIG. 4 shows a demagnetizing sub having an electromagnetic erasure field perpendicular to the wellbore.

Turning now to FIG. 4, a schematic of the disclosure is illustrated showing a demagnetizer sub 100 with B field 311 of electromagnetic coil 309 oriented orthogonal to the axis of the wellbore 306. The sub may be part of a bottomhole assembly conveyed on a drilling tubular or may be part of a string of wireline conveyed subs. In this configuration, the direction of the B field 311 is in a plane orthogonal to the wellbore axis 306 and the demagnetizer sub 100 axis. The electric current runs parallel to the axis. The electromagnet can be similar to an anchor of a direct current (DC) electromotor. The anchor can have one pole or more, for example, 2 pole and 4 pole configurations.

The present disclosure provides a demagnetizer sub 100 that can demagnetize particles of the wall of the wellbore 306 that have been magnetized by a previous magnetic tool run. In general, the magnetizable particles are in the drilling mud and hence in the mud cake, lining the wellbore wall. Magnetization of the wellbore environment can also happen if ferromagnetic components such as magnetite exist in the geologic formation. The demagnetizing is achieved by activating an AC (alternating current) electromagnet and moving it along the axis of the wellbore. The present disclosure is also usable with a wireline logging tool.

A standard method to demagnetize hard magnetic material is to apply an alternating magnetic field. The amplitude of the alternating magnetic field is selected to achieve a relatively high strength to ensure that the magnetic hysteresis loop of the component to be demagnetized is symmetrical with respect to the origin of the B-H (hysteresis) diagram. Subsequently the amplitude is decreased slowly in order that the run-through hysteresis loop becomes smaller and smaller and disappears eventually.

The demagnetizer sub 100 described herein is an alternating current (AC) electromagnet, which provides a high magnetic field amplitude. A continuous and slow decrease of the field amplitude at the place of the magnetized mud particles is achieved by moving the electromagnet along the wellbore axis. Ideally the demagnetizing field initially reaches at least the saturation field of the magnetized component. For iron, this magnetizing field is of the order of 2 Tesla. Producing fields of this magnitude in the wellbore wall, however, may be impractical, assuming that the electric power is limited to a couple of hundred Watts. Given these power limitations, it presently is sufficient to produce a magnetic field substantially as high as the magnetic tool field which magnetized the particles. For example, if an NMR tool generates a magnetic field of 2000 Gauss having a particular spatial distribution, the demagnetizing sub of the present disclosure generates a demagnetizing field of 2000 Gauss having a similar spatial distribution.

Due to the cylindrical geometry of the wellbore, there exist essentially two geometries demonstrated herein for such an electromagnet. The electromagnet may apply a field that is either essentially parallel or orthogonal to the wellbore axis as shown above in FIG. 3 and FIG. 4.

Figure 5:
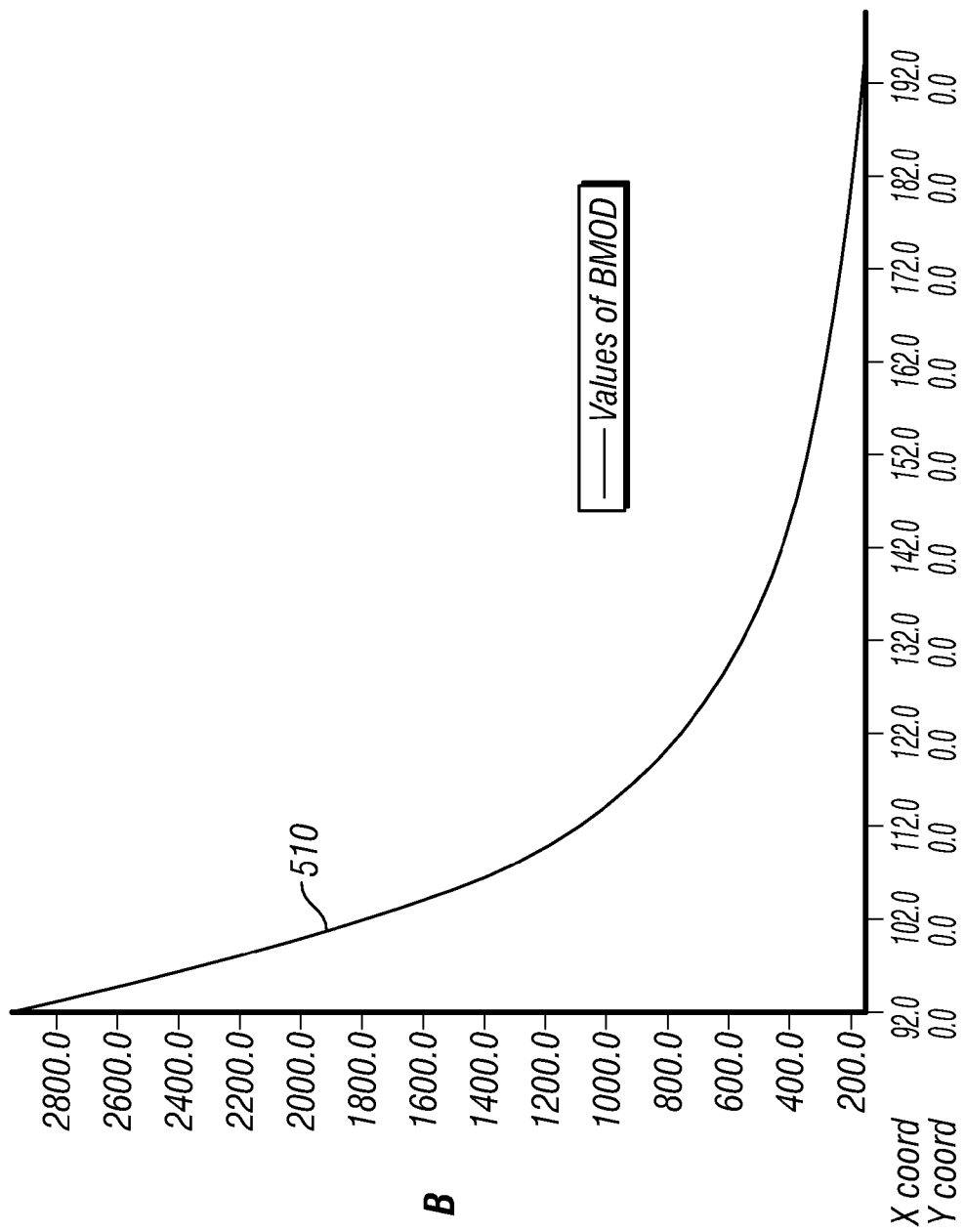
FIG. 5 is an illustration of the radial dependence of the flux density of a nuclear magnetic resonance (NMR) tool.

FIG. 5 illustrates the magnetic flux density 510 of an NMR tool. The maximum flux density at the tool surface (radius 92 mm) is about 2200 Gauss. For a centered tool, the flux density at the nominal wellbore wall (radius 108 mm) is about 1200 Gauss. FIG. 5 illustrates the radial dependence of the flux density at Z=230 mm, i.e. at the lower end of the permanent magnet.

Figure 6:
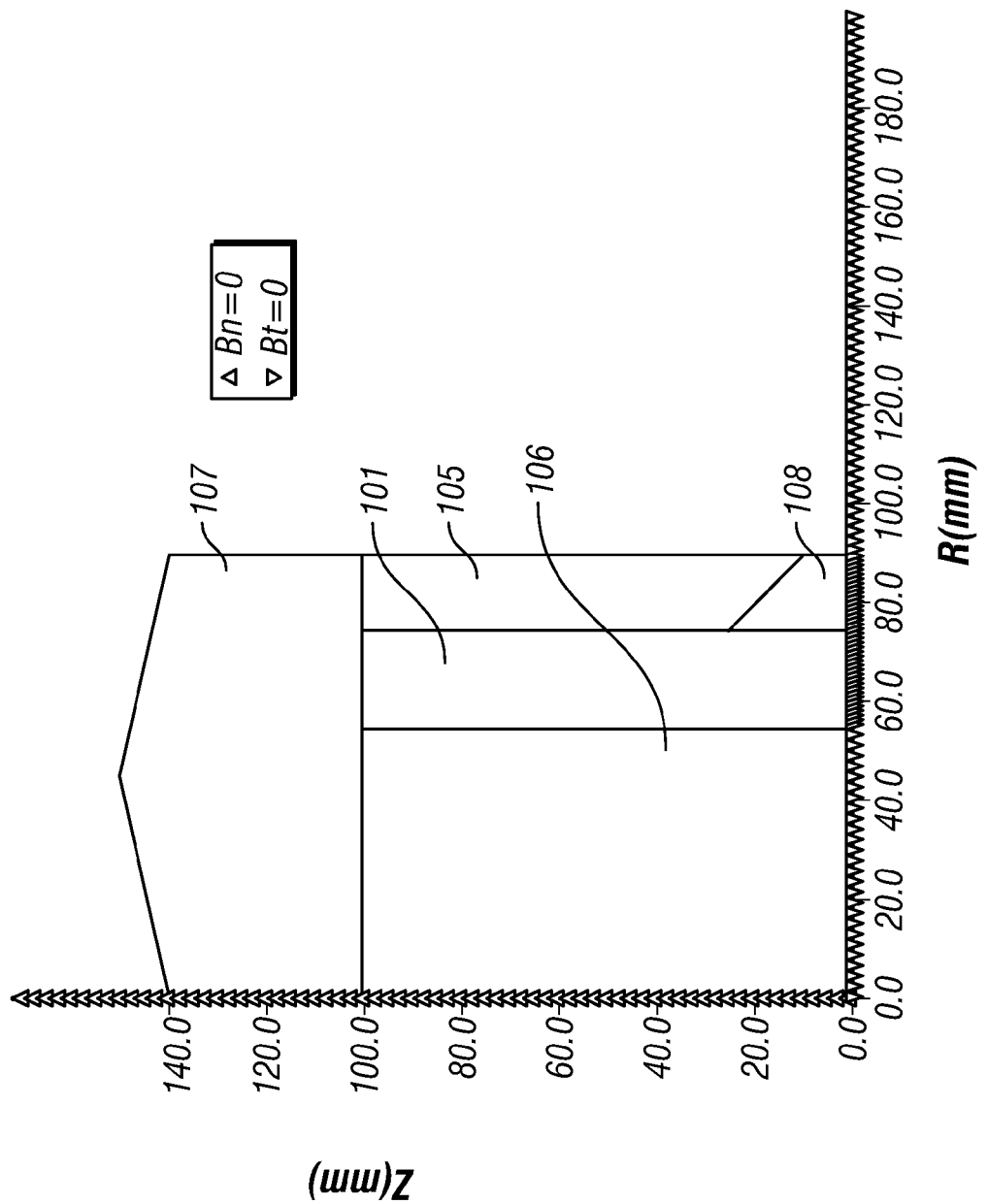
FIG. 6 shows the geometry of a demagnetizing sub having a magnetic field parallel to the wellbore in the present disclosure.
Figure 7:
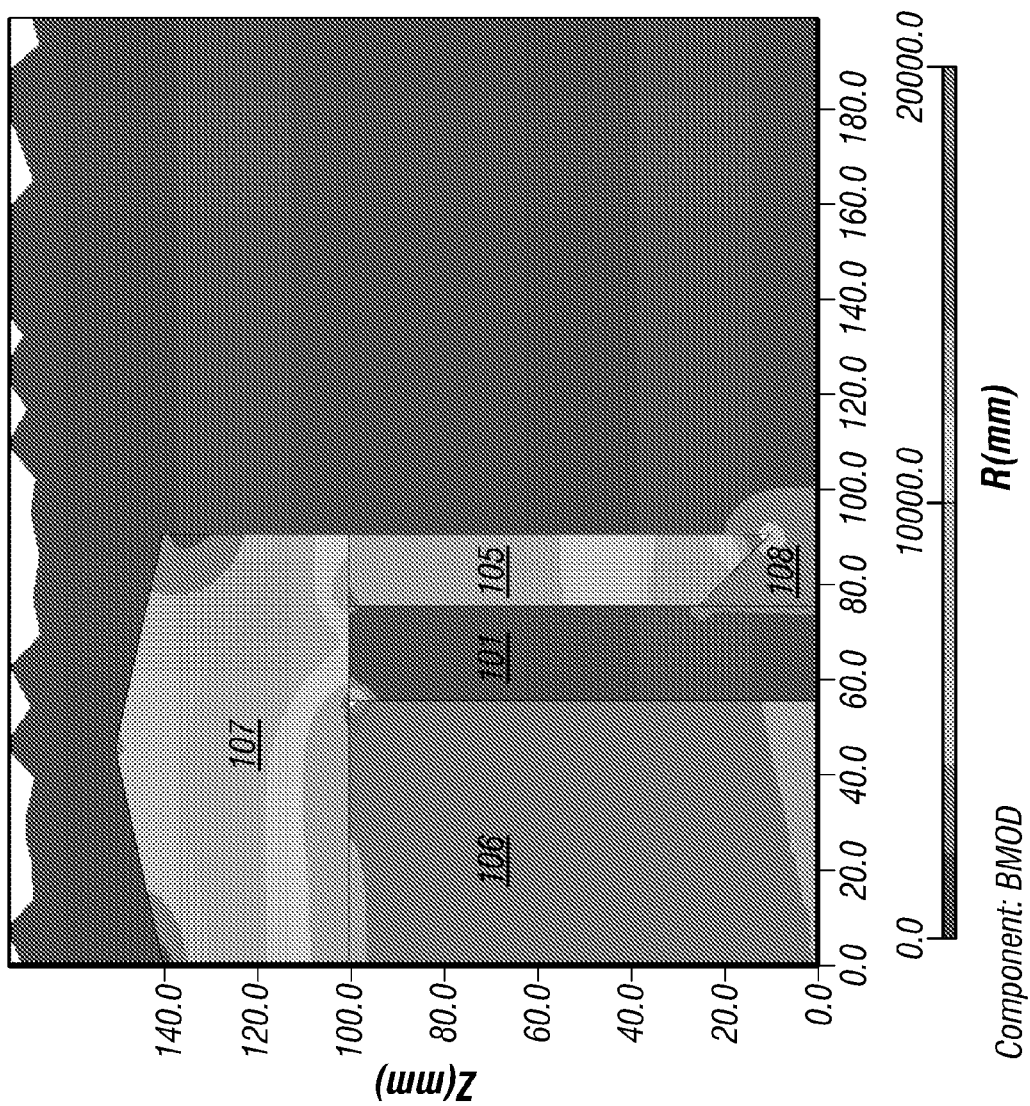
FIG. 7 is a contour plot of magnetic flux density showing magnetic flux in an iron portion of the demagnetizing sub of FIG. 6.

FIGS. 6-8 and 10-16 are finite element models showing a top right quarter section of a symmetrical element of a demagnetizer. In one embodiment, the symmetrical element may be an iron sheet, many of which may be stacked upon one another. FIG. 6 illustrates one example of a geometry for the electromagnet of the demagnetizing sub 100 for generating a magnetic flux parallel to the wellbore axis. Areas 105 and 106 are made of transformer iron. Area 107 is a yoke made of soft magnetic material to facilitate manufacturing and to concentrate the flux. Area 101 is a copper coil and area 108 is a gap where the erasing magnetic flux density is concentrated. FIG. 7 illustrates a contour plot of the magnetic flux density for the geometry of FIG. 6. The contour plot shows a magnetic flux density that it is approximately 15,000 Gauss in the transformer iron.

Figure 8:
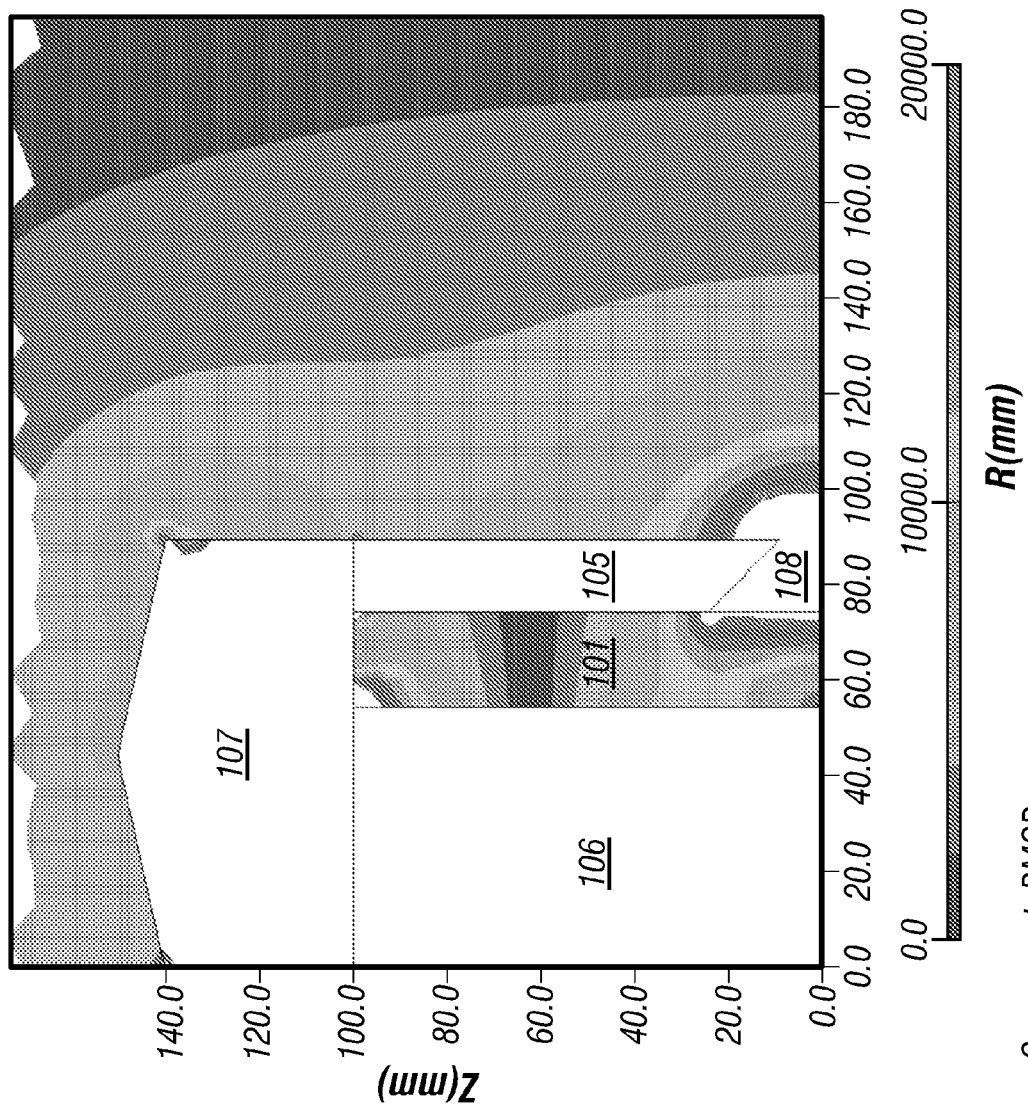
FIG. 8 is a contour plot of the magnetic flux density showing the distribution of the magnetic flux outside of the demagnetizing sub of FIG. 6.
Figure 9:
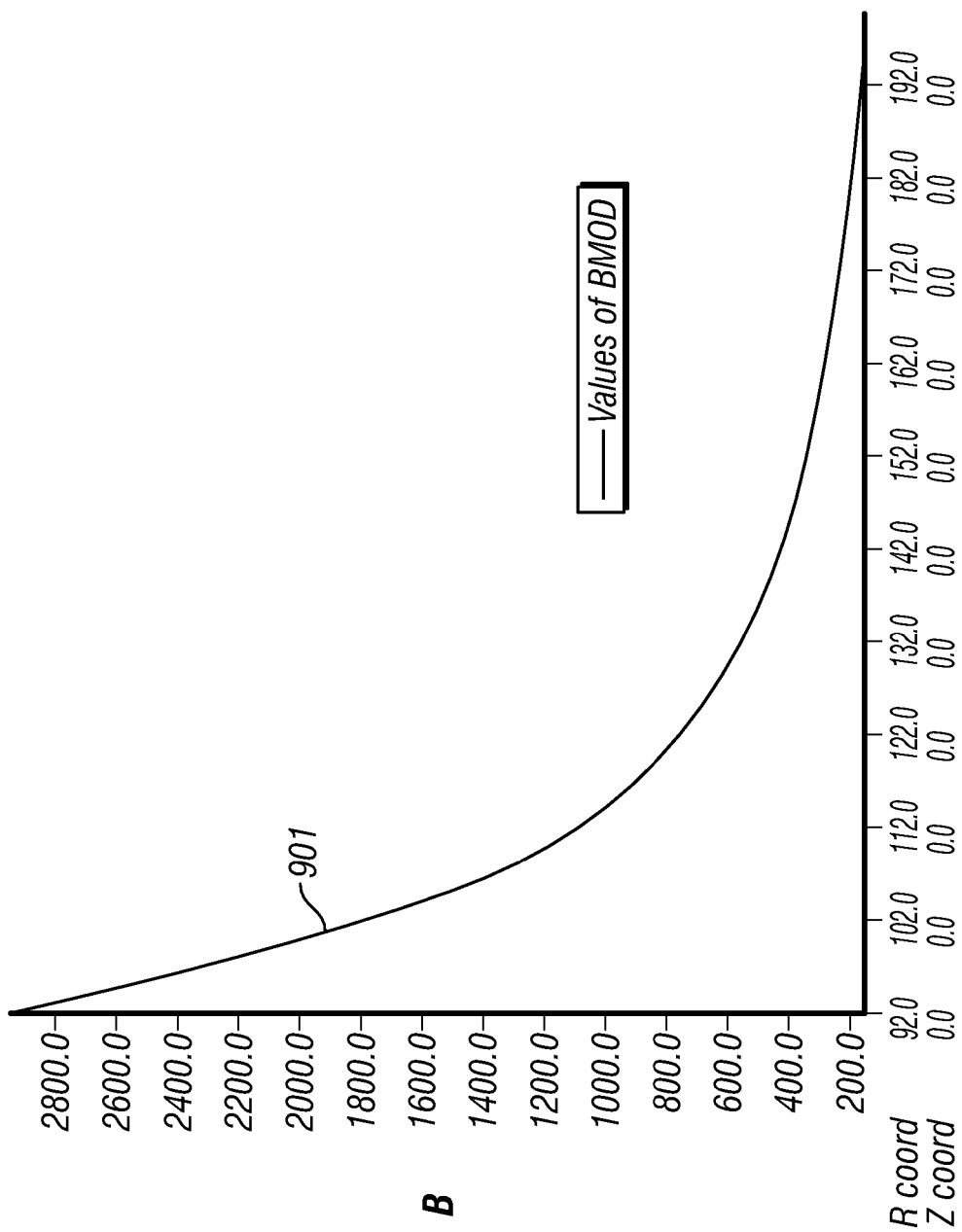
FIG. 9 is a plot of the flux density B over the radius R in the center plane of the demagnetizing sub.

FIG. 8 illustrates a contour plot of the magnetic flux density for the geometry of FIG. 6, showing the distribution outside the demagnetizer. FIG. 9 illustrates a magnetic flux density B over radius R in the center plane of the demagnetizer sub for the geometry of FIG. 6. The Z-axis represents the longitudinal axis and center of the wellbore and of the demagnetizing sub 100. Further increasing the electrical power does not gain much more magnetic flux density as it is limited by the beginning of saturating the iron. An advantage of this geometry is that the iron can easily be formed from layers of transformer sheet (a laminated structure). The 2-D finite element models show a cross section orthogonal to the tool axis. The calculated field profiles are only correct for a tool that extends to infinity in the direction of the axis. For this reason the power dissipation results are stated in Watts/mm.

Figure 10:
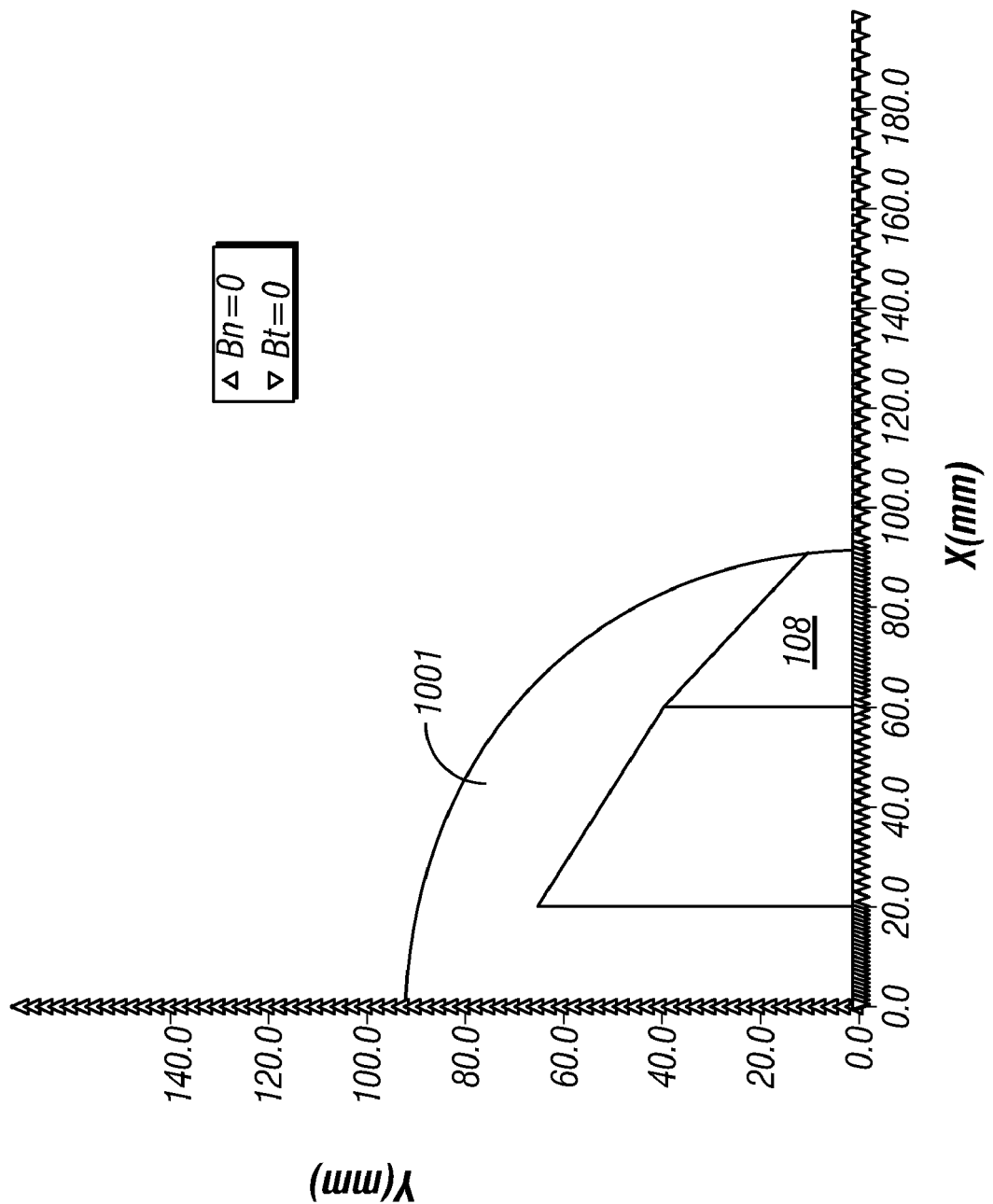
FIG. 10 shows the geometry of a quarter section of an exemplary two-pole demagnetizer.
Figure 10A:
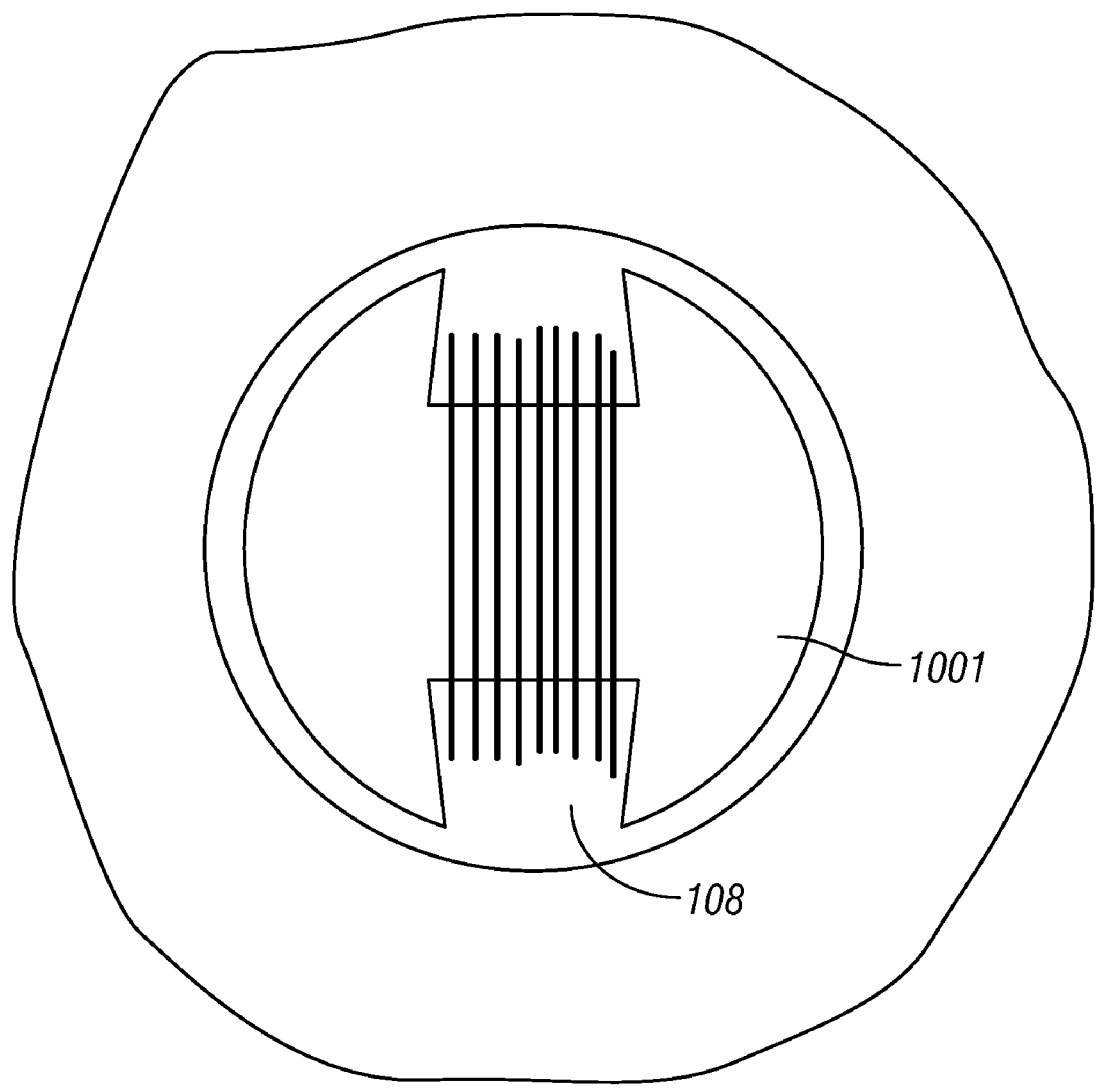
FIG. 10A shows the geometry of a horizontal section of the two-pole demagnetizer of FIG. 10.
Figure 12:
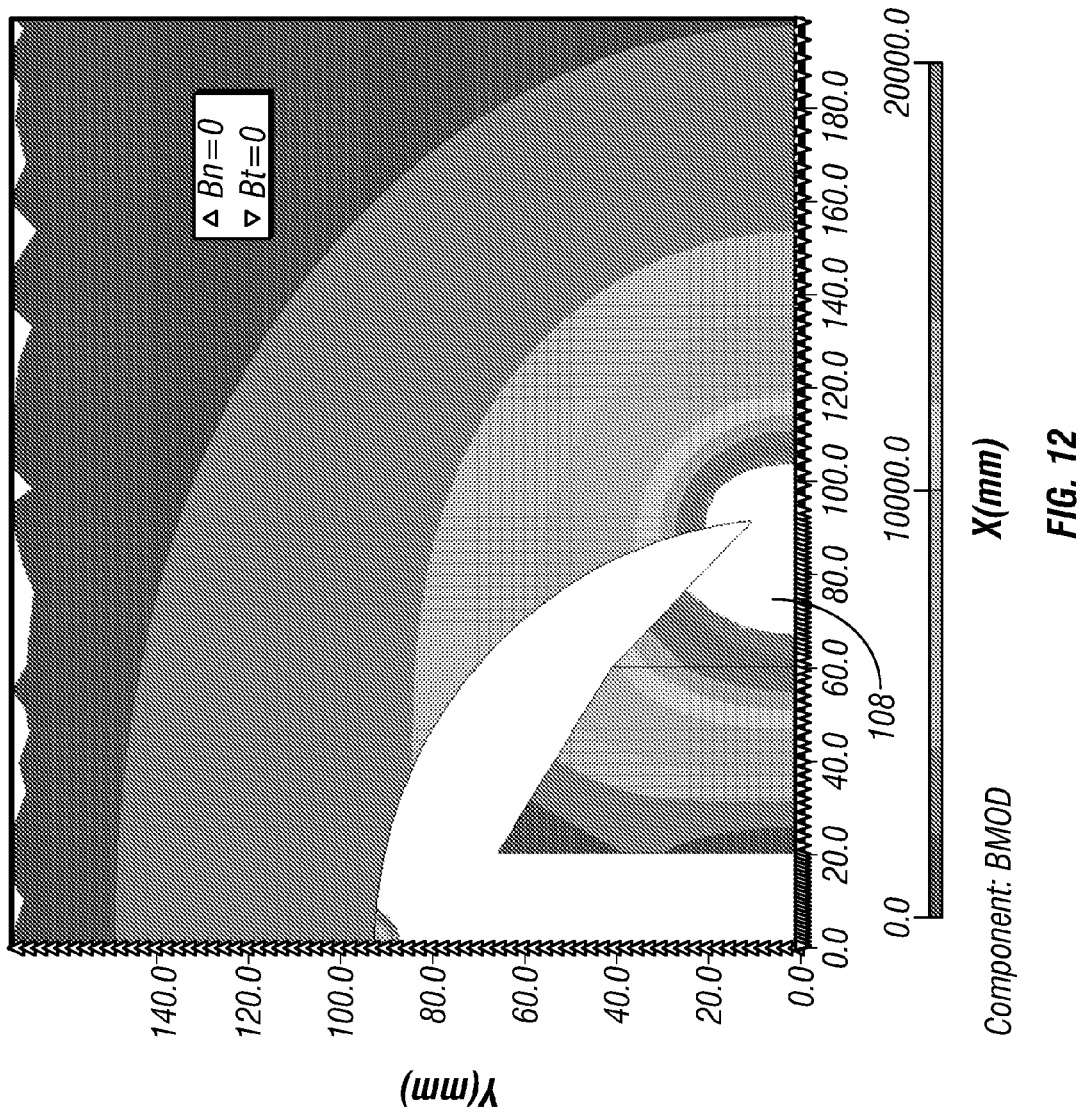
Figure 13:
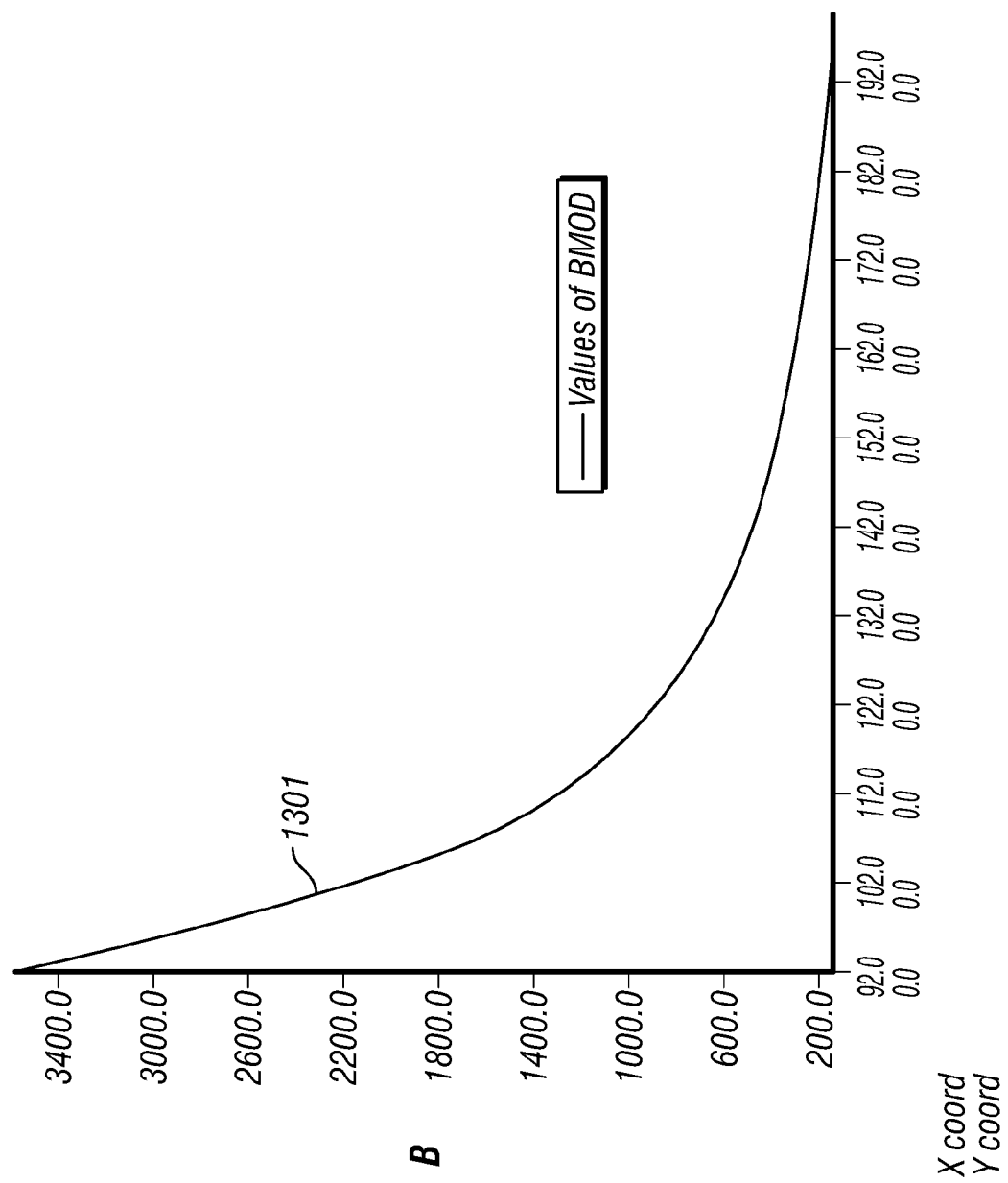
FIG. 13 shows the radial decay of magnetic flux density for the demagnetizer of FIG. 10.

FIGS. 10-13 show finite element modeling for one-quarter of a full cross section of a two-pole electromagnet demagnetizer 1001 generating a magnetic flux field perpendicular to the wellbore axis. The geometry of a quarter section of the two-pole electromagnet demagnetizer 1001 is shown in FIG. 10. A horizontal section of the two-pole demagnetizer 1001 is shown in FIG. 10A. FIG. 11 shows the magnetic flux density in the quarter section of the demagnetizer of FIG. 10. FIG. 12 shows the magnetic flux density outside the two-pole demagnetizer 1001. FIG. 13 shows the decay of the flux density 1301 with radius.

Figure 14:
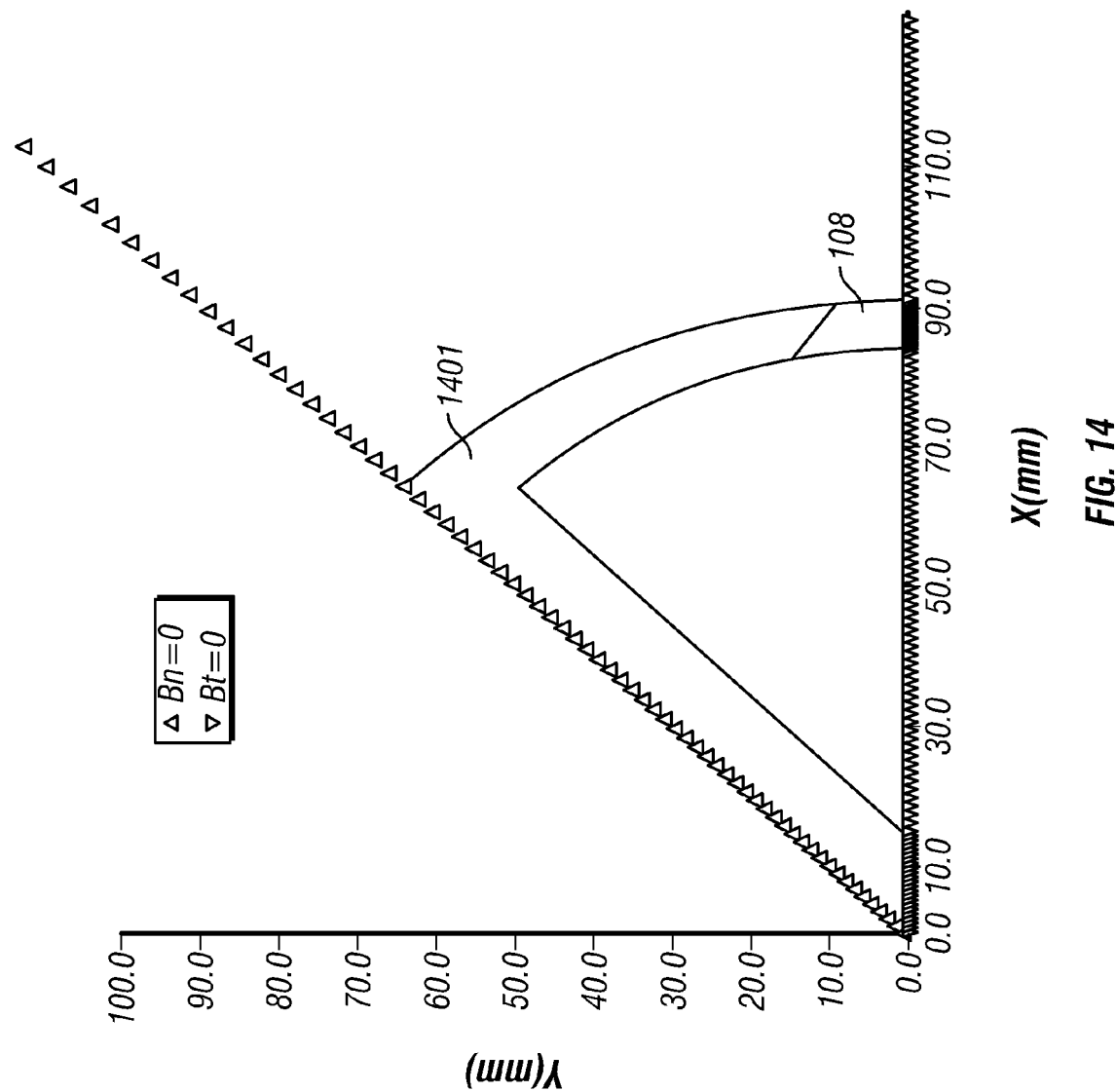
FIG. 14 shows the geometry of an eighth section of an exemplary four-pole demagnetizer.
Figure 14A:
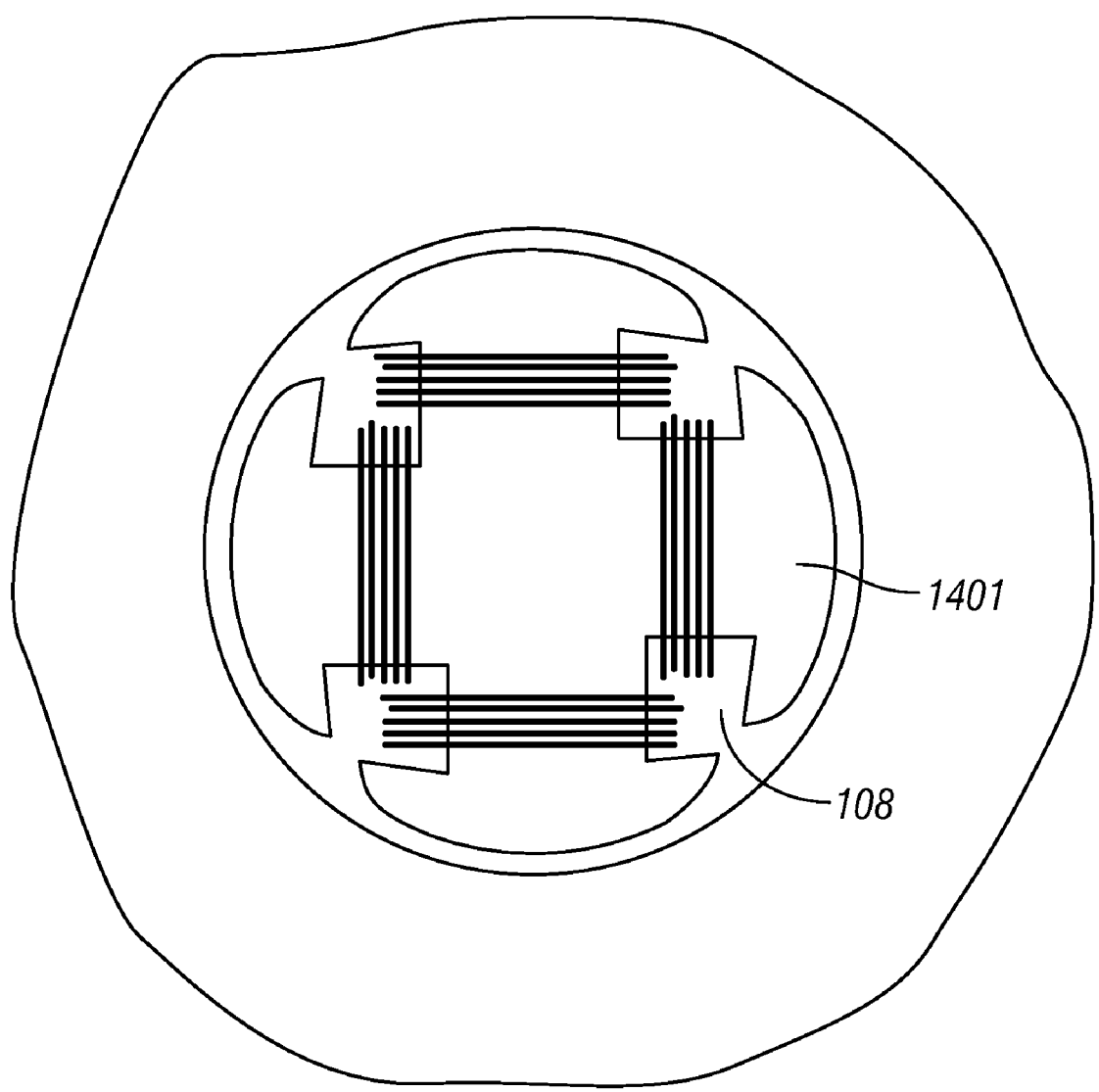
FIG. 14A shows the geometry of a horizontal section of the four-pole demagnetizer of FIG. 14.
Figure 15:
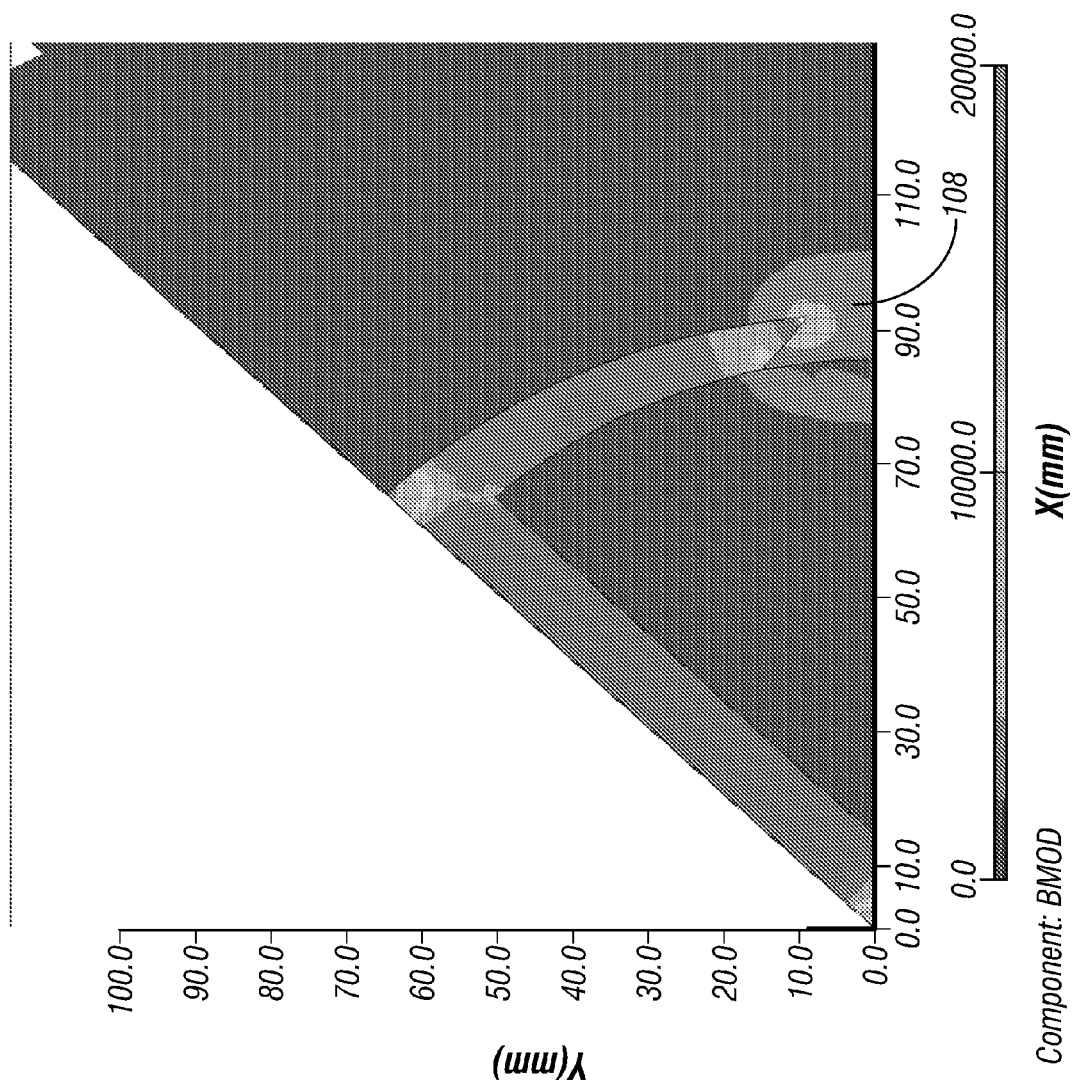
FIGS. 15-16 show contour plots of the magnetic flux density for the four-pole demagnetizer of FIG. 14.
Figure 16:
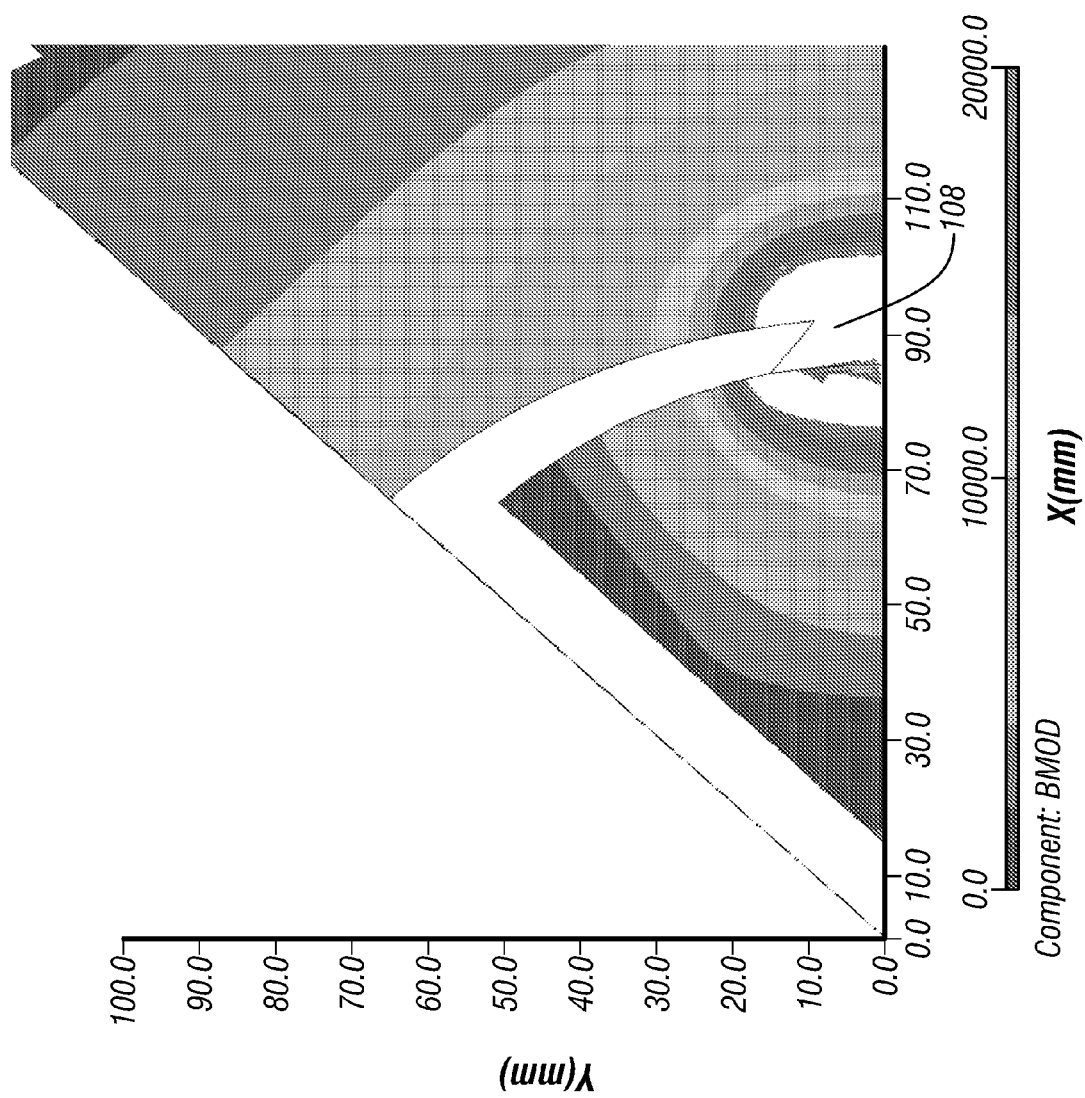
Figure 17:
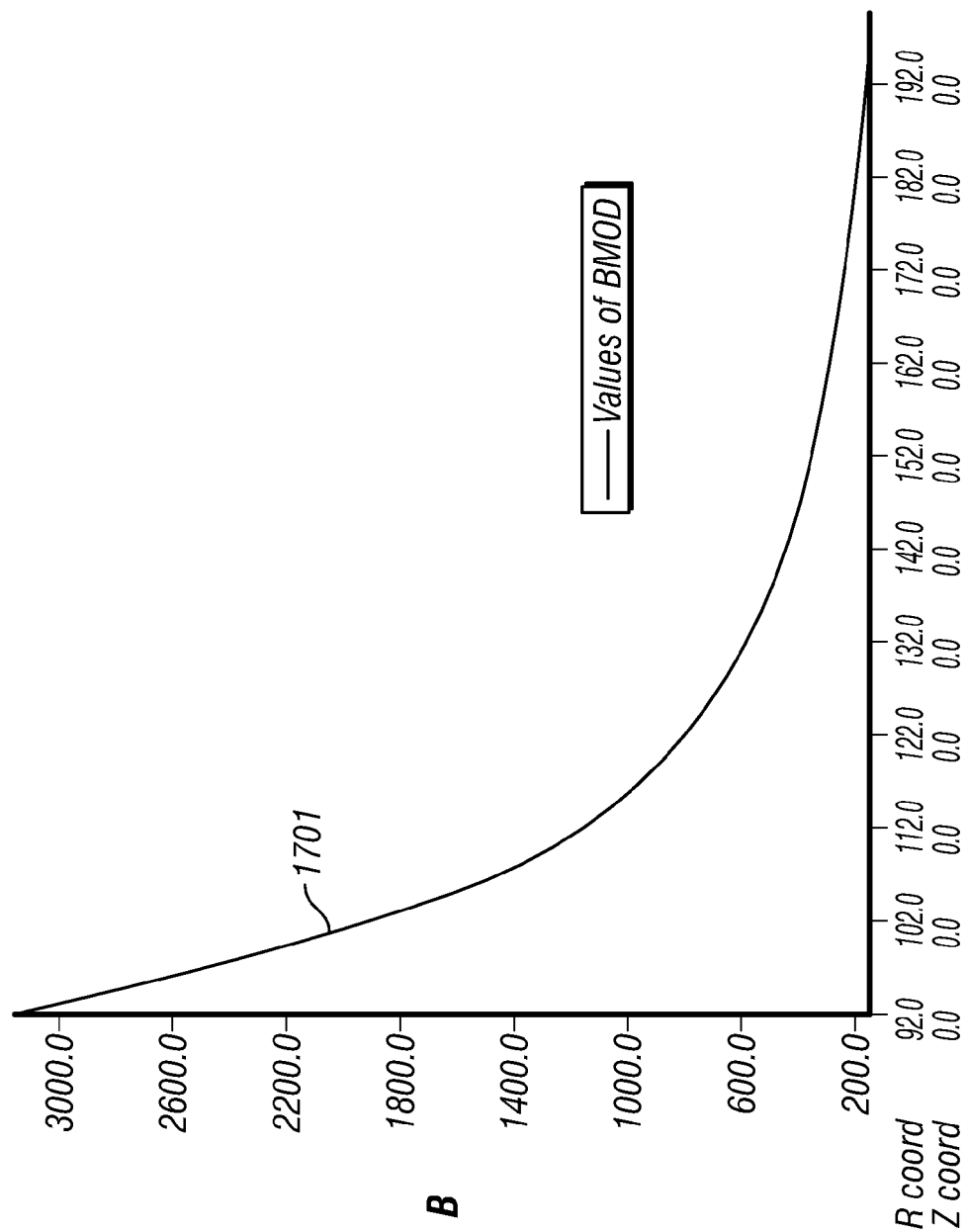
FIG. 17 shows the radial decay of magnetic flux density for the four-pole demagnetizer of FIG. 14.

FIGS. 14-17 show finite element modeling for one-eighth of a full cross section of a four-pole electromagnet demagnetizer 1401 generating a magnetic flux field perpendicular to the wellbore axis. The Z-axis is parallel to the longitudinal axis of the wellbore and the demagnetizing sub 100, which is perpendicular to the X, Y plane of FIGS. 10-17. FIGS. 14 shows a geometry of an eighth section of the four-pole demagnetizer 1401. FIG. 14A shows the geometry of a horizontal section of the four-pole demagnetizer. FIGS. 15 and 16 are contour plots of the flux density in the eighth section of FIG. 14. The magnetic flux is concentrated about the gaps 108. FIG. 17 is a plot of the radial decay of the flux density 1701.

Figure 18:
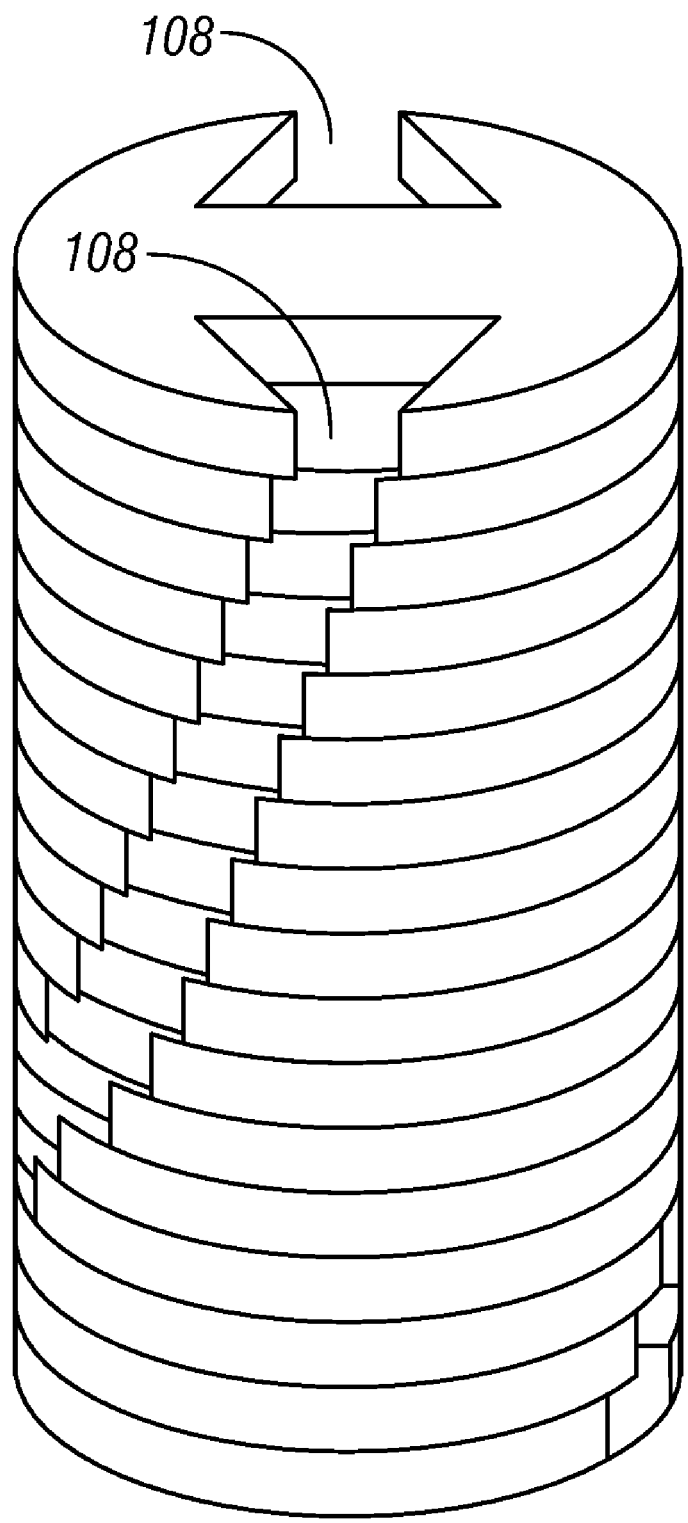
FIG. 18 shows an exemplary helical arrangement of a laminated core of a two-pole electromagnet.

In one aspect, the iron sheets previously disclosed are not stacked directly on top of each other but are slightly shifted by a small angle with respect to the adjacent sheets so that the iron core resulting from the stacked iron sheets forms a helical structure. FIG. 18 illustrates an exemplary helical structure through the shift of the angular location of gap 108 with depth. For a two-pole core a helix is provided with half a turn to ensure that the entire wellbore wall gets demagnetized when the (non-rotating) demagnetizer tool is run through the wellbore. For a four-pole tool, a quarter-helix is provided to achieve a completely demagnetized wellbore. In another embodiment using the two-pole configuration, two demagnetizing fields separated by 180° are provided, and the demagnetizing sub rotates at least 180° or one-half turn to expose the entire 360° angular section of the wellbore at a particular depth to the demagnetizing fields. Similarly, for the four-pole configuration, four demagnetizing fields separated by 90° are provided and the demagnetizing sub rotates at least 90° or one-quarter turn to expose the entire 360° angular section of the wellbore at a particular depth to the demagnetizing field.

To ensure a good demagnetizing effect further away from the tool, the pitch of the helix is not too small. Eventually the length of the tool and its power dissipation depends on the minimum pitch that can be tolerated. An iron yoke is provided with a reasonably small gap 108 to produce a magnetic field of high enough strength with a limited electric power input. The transverse field geometry provides fewer problems with iron saturation. The transverse field geometry is also better suited to the use of laminated transformer iron. The field decays quickly away from the demagnetizer tool.

The design ensures that losses to induced eddy current losses are minimized, thereby conserving power. If the power source is DC, it is useful to use at least two or more magnetic poles. Giving the different poles an appropriate phase shift to each other ensures that power consumption is the same at every point in time.

As an example, for a two-pole configuration, the phase shift is 90° between poles. For a three-pole configuration, the phase shift may be either 60° or 120° between poles. The 120° pole configuration typically makes better use of the iron, as in the case of a 3-phase main transformer.

Figure 19:
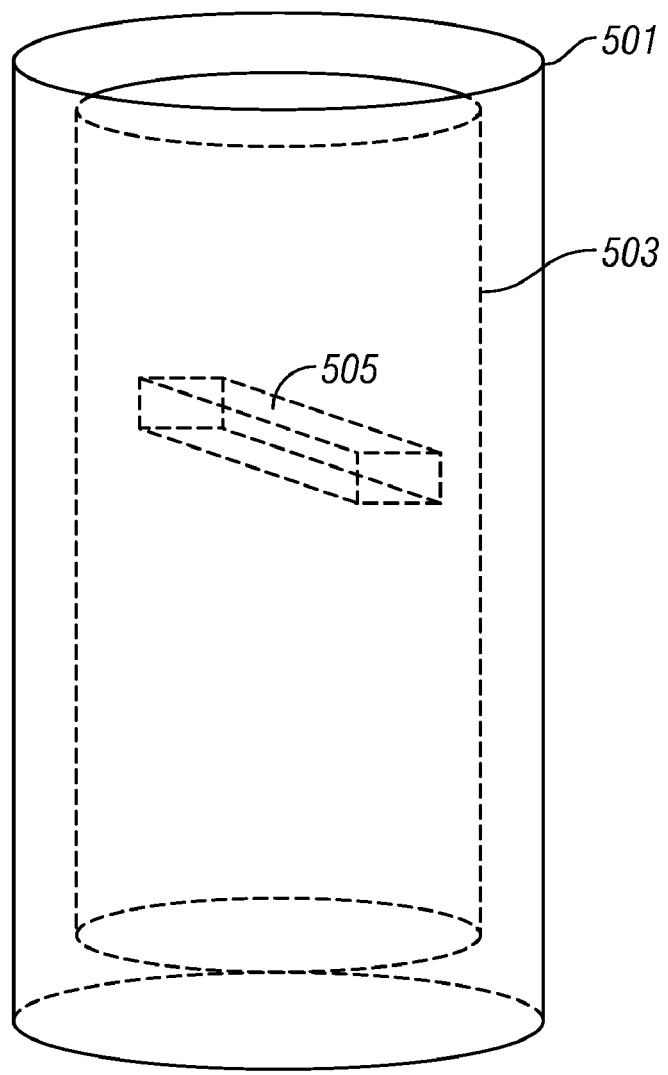
FIG. 19 shows an embodiment of the present disclosure using a permanent magnet.
Figure 20:
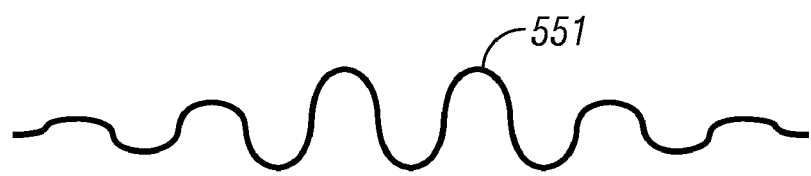
FIG. 20 shows a magnetic field at a selected depth when the embodiment of FIG. 19 is conveyed through the wellbore.

Another embodiment of the present disclosure uses a spinning permanent magnet on the downhole assembly. The spinning magnet can be either a permanent magnet or a DC-powered electromagnet. An exemplary spinning permanent magnet is depicted schematically in FIG. 19. Shown in a wellbore having a wall 501 is a downhole assembly 503 that includes a permanent magnet 505. The permanent magnet spins within the wellbore while the assembly is being moved through the wellbore. FIG. 20 illustrates the magnetic field 551 that is observed at a specific position the wellbore wall due to a spinning permanent magnet as the downhole assembly is moved through the wellbore. When the downhole assembly is conveyed on a drilling tubular, the spinning may be accomplished by rotation of the drilling tubular. When the downhole assembly is conveyed on a wireline, then a suitable motor (not shown) may be provided on the downhole assembly to accomplish the rotation.

Referring to FIG. 2, there is shown a rig 210 on the surface that is positioned over a subterranean formation of interest 212. The rig 210 may be a part of a land or offshore a well production/construction facility. A wellbore 214 formed below the rig 210 includes a cased portion 216 and an open hole portion 218. In certain instances (e.g., during drilling, completion, work-over, etc.), a logging operation is conducted to collect information relating to the formation 212 and the wellbore 214. Typically, a logging string 200 is conveyed downhole via an umbilical 208 to measure one or more parameters of interest relating to the wellbore 214 and/or the formation 212. The term "umbilical" as used hereinafter includes a cable, a wireline, slickline, drill pipe, coiled tubing and other devices suitable for conveying a tool into a wellbore. The logging string 200 can include one or more modules 202A and 202B, each of which has a tool or a plurality of tools 204A and 204B, adapted to perform one or more downhole tasks. The term "module" is understood to be a device such as a sonde or sub that is suited to enclose, house, or otherwise support a device that is to be deployed into a wellbore. While two proximally positioned modules 202A and 202B and two associated tools 204A and 204B are shown, a greater or fewer number of modules and tools may be used.

In an exemplary embodiment, the tool 204A may be an NMR sensor configured to measure nuclear spin properties relating to the formation or wellbore. As is known to those versed in the art, such a sensor includes a strong permanent magnet that produces a strong magnetization of any magnetic material in the wellbore or in the formation. The exemplary NMR sensor may be of the type disclosed in U.S. Pat. No. 6,580,273 to Reiderman et al., having the same assignee as the present disclosure and the contents of which are incorporated herein by reference.

In certain embodiments, the logging string 200 may include telemetry equipment 250, a local or downhole controller 252 and a downhole power supply 254. The telemetry equipment 250 provides two-way communication for exchanging data signals between the surface controller 220 and the logging string 200 as well as for transmitting control signals from the surface processor 220 to the logging string 200.

The exemplary NMR sensor of Reiderman is a side-looking sensor and may be operated with the tool in close contact with a wall of the wellbore. In an exemplary arrangement, and not by way of limitation, the second module 202B includes a second tool 204B that may need to be in a different position of the logging string 200 than the first module 202A and the first tool 204A. The positions may be in reference to an object such as a wellbore, wellbore wall, and/or other proximally positioned tooling. Also, the term "position" is meant to encompass a radial position, an inclination, and an azimuthal orientation. Merely for convenience, the longitudinal axis of the wellbore ("wellbore axis") will be used as a reference axis to describe the relative radial positioning of the tools 204A and 204B. Other objects or points can also be used as a reference frame against which movement or position can be described.

In accordance with one embodiment of the present disclosure, modules 202A and 202B are each provided with positioning devices 240A and 240B, respectively. A given positioning device is configured to maintain an associated module at a selected radial position relative to a reference position (e.g., the wellbore axis). The position device may also adjust the radial position of the associated module upon receiving a surface command signal and/or automatically in a closed-loop type manner. This selected radial position may be maintained or adjusted independently of the radial position(s) of an adjacent downhole device (e.g., measurement tools, sonde, module, sub, or other like equipment). An articulated member, such as a flexible joint 256 which couples the modules 202A and 202B to the logging string 200, provides a degree of bending or pivoting to accommodate the radial positioning differences between adjacent modules and/or other equipment such as, for example, a processor sonde or other equipment. Further details of the positioning members are provided in U.S. Pat. No. 7,082,994 to Frost, having the same assignee as the present disclosure and the contents of which are incorporated herein by reference. In other embodiments, one or more of the positioning devices has fixed positioning members.

In normal logging operations, the logging string 200 is pulled up from the bottom of the wellbore. Hence, in order to demagnetize a portion of the wellbore that has been logged with an NMR sensor, a demagnetizer of any of the types discussed above may be located below the NMR sensor 204A. Demagnetization may be done by an exemplary demagnetization device disclosed herein at a suitable location such as at position 280. The position 280 of FIG. 2 is not to be construed as a limitation of the present disclosure, and a demagnetizer may be positioned above an NMR sensor if logging is to be carried out from the top down instead of from the bottom up. If an NMR sensor designed for making measurements in a central position of the wellbore is used, a simpler positioning device may be used instead of the positioning device discussed above. One such simpler device may be a bowspring.

In one embodiment, the second tool 204B may include a formation evaluation sensor. The formation evaluation sensor may include measurement devices, sensors, and other like devices that, actively or passively, collect data about the various characteristics of the formation, directional sensors for providing information about the tool orientation and direction of movement, and formation testing sensors for providing information about the characteristics of the reservoir fluid and for evaluating the reservoir conditions. The formation evaluation sensors may include resistivity sensors for determining the formation resistivity, dielectric constant and the presence or absence of hydrocarbons; acoustic sensors for determining the acoustic porosity of the formation and the bed boundary in formation; nuclear sensors for determining the formation density, nuclear porosity and certain rock characteristics; and nuclear magnetic resonance sensors for determining the porosity and other petrophysical characteristics of the formation; among others. The direction and position sensors preferably include a combination of one or more accelerometers and one or more gyroscopes or magnetometers. The accelerometers preferably provide measurements along three axes. Magnetometers are commonly used to provide measurements of the earth's magnetic field downhole, and a demagnetizer of the type described above may be used to enable a reliability of measurements made by the magnetometers. The formation testing sensors often collect formation fluid samples and determine the properties of the formation fluid, which include physical properties and chemical properties. Pressure measurements of the formation may be obtained to provide information about the reservoir characteristics.

While an embodiment of the disclosure has been shown by the above disclosure, it is for purposes of example only and not intended to limit the scope of the disclosure, which is defined by the following claims.

What is claimed is:

1. An apparatus configured to be conveyed on a wireline and measure a parameter of an earth formation surrounding a wellbore, comprising:
   a Nuclear Magnetic Resonance (NMR) tool that magnetizes a wall of the wellbore;
   a demagnetizing device configured to demagnetize the magnetization produced by the NMR tool of the wall of the wellbore; and
   at least one second tool spaced apart from the NMR tool and configured to measure the parameter of the earth formation.

2. The apparatus of claim 1, wherein the at least one second tool further comprises a plurality of tools.

3. The apparatus of claim 2 further comprising a second demagnetizing device configured to remove a magnetic influence of the at least one second tool from the wall of the wellbore.

4. The apparatus of claim 1, wherein the parameter is one of: (i) a formation resistivity, (ii) a dielectric constant of the formation, (iii) a presence of hydrocarbons in the formation, (iv) a porosity of the formation, (v) a density of the formation, and (vi) an earth's magnetic field.

5. The apparatus of claim 1, wherein the demagnetizing device is configured to produce a time-varying magnetic field.

6. The apparatus of claim 5, wherein the amplitude of the time-varying magnetic field of the demagnetizing device in the wall of the wellbore is affected by motion of the demagnetizing device through the wellbore.

7. The apparatus of claim 5, wherein the demagnetizing device comprises a spinning magnet that is one of: (i) a permanent magnet, and (ii) a DC-powered electromagnet.

8. The apparatus of claim 5, wherein the demagnetizing device further comprises an AC-powered electromagnet configured to provide the time-varying magnetic field having a decaying amplitude.

9. The apparatus of claim 8, wherein the demagnetizing device further comprises a processor configured to select an initial alternating current of the AC-powered electromagnet based on at least one of: (i) a saturation field of magnetized material in the wall of the wellbore, and (ii) a magnetic field intensity which magnetized the material.

10. The apparatus of claim 8, wherein the AC-powered electromagnet is one of: (i) a two-pole structure, and (ii) a four-pole structure.

11. The apparatus of claim 5 wherein an axis of the time-varying magnetic field is at least one of: (i) substantially parallel to a longitudinal axis of a downhole assembly, and (ii) substantially orthogonal to the longitudinal axis of the downhole assembly.

12. A method of measuring a parameter of an earth formation surrounding a wellbore, comprising:

conveying a Nuclear Magnetic Resonance (NMR) tool and at least one second tool in the wellbore on a wireline, the NMR tool magnetizing a wall of the wellbore;

removing the magnetization of the wall of the borehole produced by the NMR tool using a demagnetizing device; and measuring the parameter of the earth formation using the at least one second tool.

13. The method of claim 12, wherein the at least one second tool further comprises a plurality of tools.

14. The method of claim 12 further comprising removing a magnetic effect of the at least one second tool from the wall of the wellbore using a second demagnetizing device.

15. The method of claim 12, wherein the parameter is one of: (i) a formation resistivity, (ii) a dielectric constant of the formation, (iii) a presence of hydrocarbons in the formation, (iv) a porosity of the formation, (v) a density of the formation, and (vi) an earth's magnetic field.

16. The method of claim 12, further comprising using the demagnetizing device for producing a time varying magnetic field.

17. The method of claim 16, wherein the amplitude of the time-varying magnetic field in the region of the wellbore is affected by moving the demagnetizing device through the wellbore.

18. The method of claim 16, further comprising using, for the demagnetizing device, a spinning magnet that is one of: (i) a permanent magnet, and (ii) a DC-powered electromagnet.

19. The method of claim 16, further comprising using, for the demagnetizing device, an AC powered electromagnet providing the time-varying magnetic field having a decaying amplitude.

20. The method of claim 19, further comprising using a processor for selecting an initial alternating current of the AC-powered electromagnet based on at least one of: (i) a saturation field of magnetized material in the wall of the wellbore, and (ii) a magnetic field intensity which magnetized the material in the wall of the wellbore.

21. The method of claim 19, further comprising using, for the AC-powered electromagnet, one of: (i) a two-pole structure, and (ii) a four-pole structure.

22. The method of claim 16 wherein an axis of the time-varying magnetic field is at least one of (i) substantially parallel to a longitudinal axis of a downhole assembly, and (ii) substantially orthogonal to the longitudinal axis of the downhole assembly.

* * * * *